(12) United States Patent
Modarresi

(10) Patent No.: US 10,515,378 B2
(45) Date of Patent: Dec. 24, 2019

(54) EXTRACTING RELEVANT FEATURES FROM ELECTRONIC MARKETING DATA FOR TRAINING ANALYTICAL MODELS

(71) Applicant: Adobe Inc., San Jose, CA (US)

(72) Inventor: Kourosh Modarresi, Stanford, CA (US)

(73) Assignee: Adobe Inc., San Jose, CA (US)

( * ) Notice: Subject to any disclaimer, the term of this patent is extended or adjusted under 35 U.S.C. 154(b) by 709 days.

(21) Appl. No.: 14/853,999

(22) Filed: Sep. 14, 2015

(65) Prior Publication Data

US 2017/0076299 A1 Mar. 16, 2017

(51) Int. Cl.
*G06Q 30/02* (2012.01)

(52) U.S. Cl.
CPC ..... *G06Q 30/0201* (2013.01); *G06Q 30/0202* (2013.01)

(58) Field of Classification Search
CPC .............. G06Q 30/0201; G06Q 30/0202
USPC ................................ 705/7.29, 7.31
See application file for complete search history.

(56) References Cited

U.S. PATENT DOCUMENTS

| | | | | |
|---|---|---|---|---|
| 2004/0039657 A1* | 2/2004 | Behrens | .............. | G06F 17/3069 705/26.7 |
| 2009/0265404 A1* | 10/2009 | Tzeng | ..................... | G06F 17/16 708/208 |
| 2013/0227054 A1* | 8/2013 | Zhang | .................... | G06Q 30/06 709/217 |
| 2014/0337275 A1* | 11/2014 | McCann | ................. | G06N 5/048 706/52 |

OTHER PUBLICATIONS

Hui Zou, et al., "Sparse Principal Component Analysis", Stanford University, web.stanford.edu/~bastie/Papers/spc_jcgs.pdf, 22 pages.
Zhang, Zhenyue, "Low-Rank Approximations with Sparse Factors II: Penalized Methods with Discrete Newton-Like Iterations", National Energy Research Scientific Computing Division Ernest Orlando Lawrence Berkeley National Laboratory, Reference LBNL-44217, Sep. 1999, 21 pages.

(Continued)

*Primary Examiner* — Charles Guiliano
(74) *Attorney, Agent, or Firm* — Kilpatrick Townsend & Stockton LLP

(57) ABSTRACT

In certain embodiments, an analytical application accesses electronic marketing data that is automatically generated by interactions with marketing communications. The analytical application represents the set of electronic marketing data as a data matrix, in which columns of the matrix correspond to features of the data set. The analytical application selects a constraint for a singular value decomposition of the initial matrix and performs the singular value decomposition with the constraint. The constrained singular value decomposition derives, from the initial matrix, a matrix of singular vectors having a threshold number of rows with non-zero coefficients. The analytical application identifies certain columns from the initial matrix that correspond to the rows of the derived matrix with the non-zero coefficients and selects the features corresponding to those columns. The analytical application trains the analytical model using the selected features.

20 Claims, 7 Drawing Sheets

(56) References Cited

OTHER PUBLICATIONS

Witten, Daniel M., et al., "A Penalized Matrix Decomposition, With Applications to Sparse Principal Components and Canonical Correlation Analysis", Biostatistics, 10, 3, pp. 515-534, Apr. 17, 2009, Oxford University Press.

Tibshirani, Robert "Regression Shrinkage and Selection Via the Lasso", Journal of the Royal Statistical Society, Series B, vol. 58, Issue 1, 1996, 23 pages.

Srebro, Nathan, "Rank, Trace-Norm and Max-Norm", University of Toronto Department of Computer Science and Hebrew University Institute of Computer Science, 2005, 15 pages.

Shlens, Jonathan, "A Tutorial on Principal Component Analysis", Google Research, Version 3.02, Apr. 7, 2014, 12 pages.

Baker, Kirk, "Singular Value Decomposition Tutorial", Tutorial, Mar. 29, 2005 and revised Jan. 14, 2013, 24 pages.

Joliffe, I.T., et al., A Modified Principal Component Technique Based on the Lasso, Journal of Computational and Graphical Statistics, 12(3), 2003, 18 pages.

Golub, Gene H., et al., "Matrix Computations", Third Edition, Department of Computer Science Stanford and Cornell University, The Johns Hopkins University Press, 1996, 169 pages.

Donoho, David L., et al., "Sparse Nonnegative Solution of Underdetermined Linear Equations by Linear Programming" National Academy of Sciences, Mar. 2005, corrected Apr. 8, 2005, 17 pages.

Hastie, Trevor, et al., The Elements of Statistical Learning, Data Mining, Inference and Prediction, Springer Series in Statistics, Second Edition, Feb. 1999, 758 pages.

Elden, L., "Algorithms for the Regularization of Ill-Conditioned Least Problems", ResearchGate, Bit 17(2), May 1977, retrieved Sep. 3, 2015, 13 pages.

\* cited by examiner $$X = UDV^T$$

EXTRACTING RELEVANT FEATURES FROM ELECTRONIC MARKETING DATA FOR TRAINING ANALYTICAL MODELS

TECHNICAL FIELD

This disclosure relates generally to computer-implemented methods and systems and more particularly relates to efficiently using computing resources for training automated analytical models by extracting relevant features of electronic marketing data.

BACKGROUND

Electronic marketing communications, such as e-mails and web pages, can be used by vendors and other businesses to induce customers and other users to access online content. For example, e-mails may be sent to users that have links to online video content, image content, or text content that describes different products or services. A user may click one or more links in an e-mail to access this online content via a website that is affiliated with a sender of the e-mail.

Some tools for developing marketing communications are used to identify which types of users should be targeted by specific campaigns. For example, users (or their visits to vendor websites) may have certain features indicating that the users are more likely to take a desirable action in response to receiving the marketing communication. Examples of relevant features include, but are not limited to, the user's demographic data, a search engine or other website used to access a vendor's content in response to a marketing communication from the vendor, a communication channel used to send a marketing communication to a user, etc. Examples of desirable actions include, but are not limited to, clicking on a link in a marketing communication that directs the user to a vendor's website, making a purchase at a vendor's website after accessing the website via the marketing communication, etc.

Tools for developing marketing communications use analytical models to determine relationships between certain features and desirable actions taken in response to marketing communication. For example, an analytical model receives, as inputs, data describing features of users (e.g., age group, location, education, etc.) and features of actions taken by users (e.g., clicks, conversions, etc.). The analytical model generates recommendations, probabilities, or other outputs indicating that users with one or more features will perform one or more favorable actions as a result of receiving a marketing communication.

These analytical models can be developed from historical data about different users. For example, a data set for thousands or millions of users can include data about one or more features (i.e., variables) of each user. The analytical model is "trained" to associate certain features with corresponding user actions in response to marketing communications. Through this training process, the analytical model learns which features should be used to select groups of users for future marketing communications.

Prior solutions for developing and training analytical models can present disadvantages. For example, developing a model that accounts for hundreds of variables may increase the processing requirements for the model, and (in many cases) may actually decrease the accuracy of the model. Furthermore, some of the features may not be particularly useful for predicting outcomes. For example, a user's age and demographic may have more influence on his or her actions than, for example, the type of web browser they use.

Therefore, it is desirable to reduce the number of features used in training an analytical model to improve efficiency and accuracy when training the model.

SUMMARY

According to certain embodiments, systems and methods are provided efficiently using computing resources for training automated analytical models by identifying significant features of a data set. The analytical application accesses electronic marketing data that is automatically generated by user interactions with electronic marketing communications. The analytical application selects a subset of features described by the marketing data for training the analytical model. For example, the analytical application first represents the data set as a data matrix, in which columns of the matrix correspond to features of the data set. The analytical application selects a constraint for a singular value decomposition of the initial matrix and performs the singular value decomposition with the constraint. The constrained singular value decomposition derives, from the matrix representing the original data set, a matrix of singular vectors having a threshold number of rows with non-zero coefficients. The analytical application uses the results of the singular value decomposition to select a subset of features from the original data. For example, the analytical application identifies certain columns from the initial matrix that correspond to the rows of the derived matrix with the non-zero coefficients, then selects the features from the data set that correspond to the identified columns of the initial matrix used to represent the data set. The analytical application then trains the analytical model using the selected features. In some embodiments, training the analytical model using the selected features (which are more significant) rather than the entire original data set allows the analytical model to be accurately trained while using computing resources more efficiently.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings, where.

DETAILED DESCRIPTION

Figure 1:
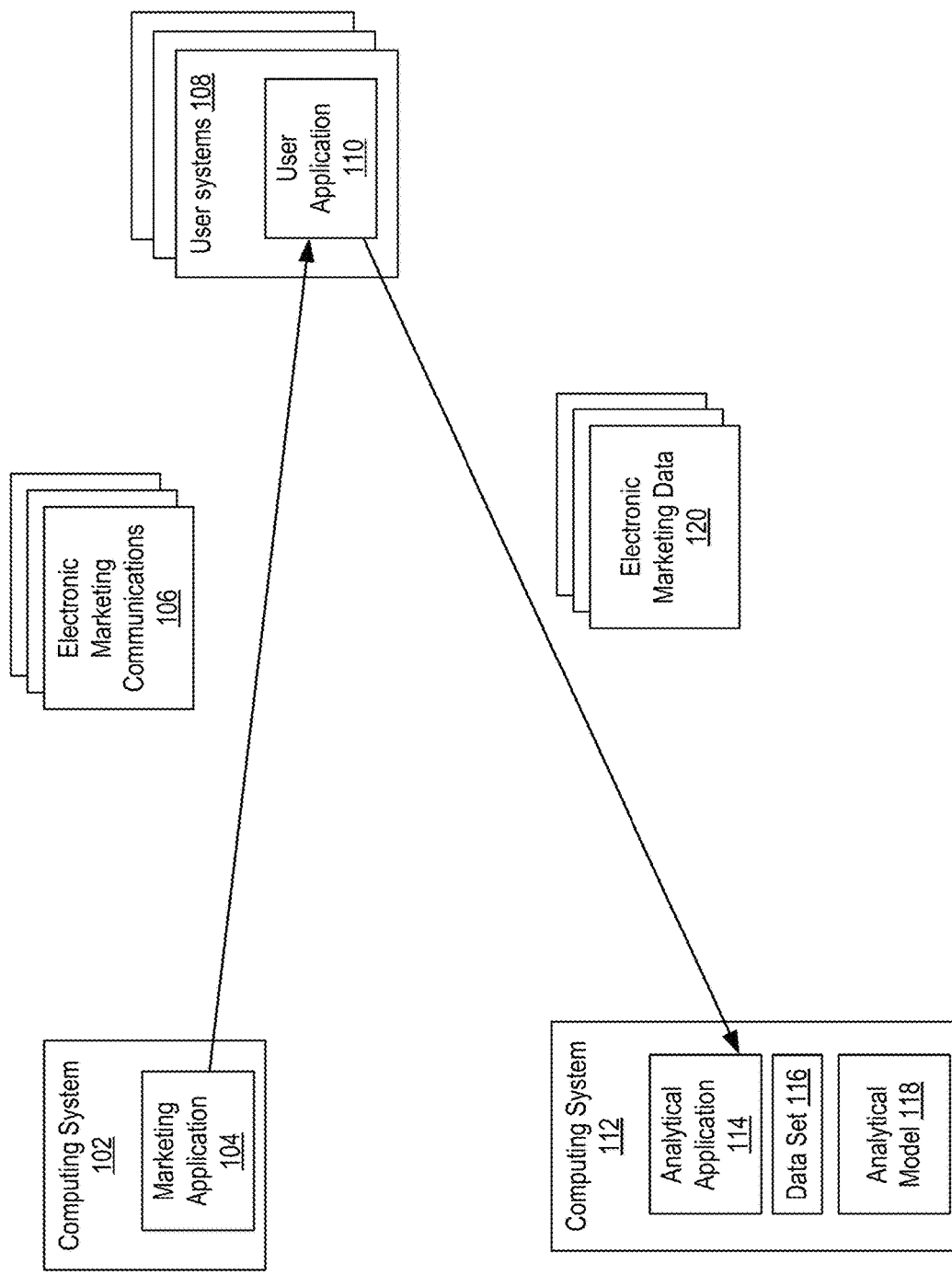
FIG. 1 is a block diagram depicting networked computing systems that communicate electronic marketing communications and electronic marketing data that is generated automatically through interactions with the electronic marketing communications according to certain exemplary embodiments.

As discussed above, prior techniques for developing and training analytic models attempted to account for all of the numerous user features and user actions tracked by analytic systems, and thus were inefficient and often ineffective. Embodiments are disclosed that identify, for a set of analytics data, the user features that are most closely related to desirable user actions so that an analytic training model can be trained efficiently and effectively using only those identified features. In certain embodiments, matrices and matrix operations are used to identify user features that are more informative of the characteristics of a data set (e.g., features having stronger relationships with desirable user actions). Using matrices and matrix operations in this manner provides particular advantages. For example, two different columns in a matrix, which can represent two different user features (e.g., a first column for "number of clicks" and a second column for "user's age"), may have a range of different values for the user features. Certain intrinsic mathematical properties of matrices indicate that variation in the number of clicks (i.e., data in the first column) is correlated with variation in the user ages (i.e., data in the second column). As described herein, certain operations for identifying these matrix properties are applied in a manner that reveals the strength of these correlations between elements of a matrix that correspond to different features of electronic marketing data. In a simplified example, a correlation between numbers of clicks on an advertisement and ages of users who viewed the advertisement may be obtained using a matrix with a first column for "number of clicks" and a second column for "age."

For instance, a data set describing user features and associated user actions can be represented as a matrix in which the rows correspond to different users and the columns correspond to different actions taken by a user and characteristics of the user (e.g., age, demographic, user location, etc.). The matrix representing the data set is transformed using a singular value decomposition matrix operation. The singular value decomposition matrix derives a set of three matrices that, when multiplied together, result in the original matrix. The features of the derived matrices indicate which features are more significant (e.g., that a number of clicks is more likely to vary with the user's age than the user's web browser type). The features that are more significant (e.g., features such as user actions and other features that are more likely to influence users to take those actions) are selected for training an analytical model.

Training an analytical model using a large numbers of features requires greater and greater processing power and other computing resources as the number of features increases. If marketing data is collected for hundreds of thousands of features, it may be computationally infeasible to train an analytics model by identifying correlations among all of the features described in the marketing data. Even if a computing system has sufficient resources to account for a larger number of features when training a model, attempting to train the analytical model with data about user characteristics having little or no impact on users' actions may tie up computing resources unnecessarily during the training process. For example, in a set of marketing data, users whose computers have a given operating system may, by chance, click on certain advertisements slightly more frequently. However, in reality, the operating system played little role in the user's decision. Therefore, including the "operating system" data when training an analytical model can unnecessarily expend resources on accounting for random associations between operating systems and click rates without providing improvement in the accuracy of the trained analytical model.

These challenges can be addressed by embodiments disclosed herein. For example, an analytical application accesses a data set comprising a large number of dimensions of electronic marketing data. The dimensions include features having values automatically generated by user interactions with electronic marketing communications. In a simplified example, a given marketing email may be transmitted to five million users. Data about the users can be automatically generated and transmitted to the analytical application when the users click on or otherwise interact with the email. Given the large number of users who receive the email, the analytical application receives click-through data associated with many different groups having different features (e.g., "users between 20 and 30 years of age," "users between 40 and 50 years of age," "users in zip code 12345," "users in zip code 54321," "users employed in the legal field," "users employed in the software field," etc.). The large number of dimensions in the marketing data may present difficulties in training an analytical model, as explained above.

To reduce the number of dimensions used to train the analytical model, the analytical application extracts more relevant features from the set of marketing data. For example, the analytical application identifies a threshold number of features for training the analytical model. This threshold number of features is selected so that computing resources are used efficiently when training the model and the accuracy of the trained analytical model is maintained. For example, if too few features are extracted, the trained analytical model may not accurately reflect the features that result in the most variation in user actions. To extract the relevant features, the marketing data is organized into an initial matrix. Each column of the initial matrix corresponds to one of the features.

The analytical application applies a singular value decomposition to the initial matrix using constraints that allow the threshold number of features from the initial matrix to be identified. The singular value decomposition to the matrix identifies three matrices that, when multiplied together, result in the initial matrix. The three matrices include a matrix of left singular vectors, a matrix of right singular vectors, and a diagonal matrix. A given matrix can have multiple singular value decompositions (i.e., multiple sets of left singular vectors, right singular vectors, and diagonal matrices). However, if the singular value decomposition is applied subject to certain constraints, the resulting derived matrices will be useful for identifying relevant features of the marketing data. For example, in some embodiments, the analytical application constrains the singular value decomposition such that a derived matrix (e.g., the matrix of right singular vectors) has a small number of non-zero entries in its rows or columns. The presence of the non-zero elements in a row or column indicates that a feature of the data set corresponding to that row or column is more strongly correlated with variation within the data set represented by the matrix. A high correlation between a given feature and variation within the data set includes, for example, cases in which having many different values in one column (i.e., feature) of the matrix is typically associated with having many different values in other columns of the matrix (e.g., variations in user ages being correlated with changes in click values, conversions, etc.). At least some of the features corresponding to the rows or columns with non-zero elements are therefore identified as the most relevant features. The analytical application then selects the identified subset of relevant features and extracts data from the data set that describes the relevant features. The analytical application trains the analytical model using the reduced data set.

In some embodiments, the systems and methods described herein improve capabilities for managing, processing, and otherwise using large sets of data collected from large volumes of interactions with electronic content. For example, a large data set (e.g., data collected from hundreds or thousands of users) may have features such as high dimensionality (i.e., a large number of different features or variables, as represented by the columns of matrix X), high sparsity (i.e., absence of data for certain features, such as a "browser type"), non-Gaussian distribution, high correlation, and an unstructured format (i.e., differences in the sets of features described by messages from different user devices). These features of large data sets present difficulties when attempting to identify relationships between features and user actions.

For instance, one or more of the above-described features of large data sets may increase computational costs for training an analytical model and reduce the accuracy of the trained model. An example of such an inaccuracy is an over-fitting of the model due to patterns in data that appear by chance (e.g., certain browsers used when with higher numbers of clicks occur). Over-fitting the model involves the model becoming unnecessarily complex in order to account for random or noisy data (e.g., data without a causal correlation to other data).

Extracting relevant features of the data may reduce these computational costs and inaccuracies. By identifying relevant features, a smaller set of data may be used to train a model. Using a smaller amount of data may decrease the computational costs of training the model. Furthermore, selecting relevant features and excluding irrelevant features reduces the amount of random or noisy data, which in turn decreases the likelihood that the model will be over-fitted to irrelevant data.

Referring now to the drawings, FIG. 1 is a block diagram depicting networked computing systems 102, 112 that communicate electronic marketing communications 106 and electronic marketing data 120 that is generated automatically through interactions with the electronic marketing communications 102.

In the illustrated example, a computing system 102 (e.g., one or more server systems operated by a marketing entity) executes a marketing application 104. The marketing application 104 is used to generate electronic marketing communications 106. Executing the marketing application 104 configures the computing system 102 to transmit the electronic marketing communications 106 to user systems 108 (e.g., laptops, tablets, smart phones, etc.) or to otherwise make the electronic marketing communications 106 available to the user systems 108.

The electronic marketing communications 106 include any suitable interactive electronic content. In one example, the marketing application 104 is used to generate emails, text messages, or other electronic marketing communications 106 with clickable hyperlinks. The computing system 102 (or another computing system in communication with the computing system 102) transmits the emails to the user systems 108 that execute email applications or other suitable user applications 110. In another example, the marketing application 104 is used to generate interactive electronic content for a website (e.g., banner advertisements). The computing system 102 (or another computing system in communication with the computing system 102) transmits the interactive electronic content to a web server. The web server transmits web pages with the interactive electronic content (i.e., the electronic marketing communications 106) to user systems 108 in response to requests or other actions by user applications 110 (e.g., web browsers).

In another example, the marketing application 104 is used to implement one or more processes that increase or decrease the frequency with which user systems 108 have access to the electronic marketing communications 106. For example, the marketing application 104 may be used to select and transmit bids for various electronic advertising events. Examples of these electronic advertising events include a search engine presenting a link to a desired advertisement or other electronic marketing communication 106 in a list of sponsored search results that includes a keyword receiving a bid, a web page displaying or otherwise presenting a desired advertisement or other electronic marketing communication 106 based on the marketing application 104 bidding on available webpage space, etc.

The interactive nature of the marketing communications 106 causes user applications 110 executed at user systems 108 to automatically generate and transmit electronic marketing data 120 to a computing system 112 (or another computing system in communication with the computing system 112), which executes an analytical application 114. The electronic marketing data 120 describes or otherwise indicates features of user interactions with the electronic marketing communications 106. In one example, if a user interacts with an electronic marketing communication 106 (e.g., by clicking a link in an email or webpage), a user application 110 responds to the interaction by automatically generating electronic marketing data 120 and transmitting the generated marketing data 120 to a computing system 112. In some embodiments, the electronic marketing data 120 describes, identifies, or otherwise indicates the type of interaction associated with the electronic marketing communication 106 (e.g., clicking a link in the communication 106, completing a purchase via a website accessible via the communication 106, etc.).

In additional or alternative embodiments, the electronic marketing data 120 describes, identifies, or otherwise indicates additional features associated with interactions with the electronic marketing communications 106. These features may include information about a user that interacted with the electronic marketing communication 106, information about the user application 108 that accessed the electronic marketing communication 106, information about a communication session during which the user interacted with the electronic marketing communication 106, etc. Examples of these features include an age of the user, a location of the user, the user's education, the type of web browser or other user application 108 used to access the electronic marketing communication 106, the identity of a search engine via which the user application 108 accessed the electronic marketing communication 106, etc.

In some embodiments, the analytical application 114 communicates with or is otherwise used in combination with the marketing application 104 to facilitate transmission of electronic marketing communications 106. Examples of entities that may use the marketing application 104 and the analytical application 114 include advertisers that may be advertising a good, a service, a location (real or virtual) or other products or entities for which advertising may prove useful. The computing system 112 allows one or more users to access the analytical application 114 through interfaces provided by the analytical application 114, such as through a web-based interface, or through a dedicated application. In some embodiments, these interactions include one or more visualizations that the analytical application 114 provides to the marketing application 104.

The marketing application 104, the user applications 110, and the analytical application 114 include program code executable by suitable processing devices of the computing systems 102, 114 and the user system 108.

In some embodiments, the analytical application 114 includes program code for training and executing an analytical model 118. The analytical model 118 includes one or more algorithms for analyzing a data set 116 that is generated from received electronic marketing data 120. The analysis is used to determine relationships between certain features of electronic marketing communications 106 and certain user actions that generate electronic marketing data 120.

In one example, the analytical model 118 accesses the data set 116, which describes features and user actions that have been identified from the electronic marketing data 120 received from user systems 108. In some embodiments, the analytical model 118 generates recommendations, probabilities, or other outputs indicating that users with certain features will perform certain favorable actions in response to receiving marketing communications 106 with certain characteristics. As a simplified example, users in a certain age group and a certain profession may be more likely to click on links in electronic marketing communications 106 that are transmitted to the users via e-mail as compared to electronic marketing communications 106 that are presented as banner advertisements in a web page.

In some embodiments, the analytical application 114 trains the analytical model to generate these recommendations based on historical user interaction data in the set 116. For example, a data set 116 may include data about user interactions and features that has been received from thousands or millions of users. The analytical application 114 trains the analytical model 118 to associate certain features with corresponding user actions in response to marketing communications. Through this training process, the analytical model 118 learns which features should be used to select groups of users for future marketing communications.

To optimize the training process for the analytical model 118, the analytical application 114 processes the data set 116 to find the most relevant features in the data set 116 prior to training the analytical model 118. In some embodiments, the relevance of certain data in the data set 116 is determined based on the correlations among certain features. For example, variation in data describing different users' ages and demographic groups may be more strongly correlated in variations in click-through rates or other interaction data, and variation in data describing different users' web browsers may be more weakly correlated with variations in click-through rates or other interaction data. Attempting to train the analytical model with features having little or no impact on user interactions may tie up computing resources unnecessarily during the training process.

In some embodiments, the analytical application 114 performs one or more matrix operations on the data set 116 to determine these relationships. The structure of a data matrix (e.g., the rows and columns) identify the concurrent existence of certain conditions (e.g., the presence of a click and the clicking action being performed by a given user). Because a matrix can be decomposed into one or more derived matrices that can be used to reconstitute the original matrix, processing a data set 116 using matrix operations can identify the strength of certain features of the data set 116. The strength of these features can be, for example, the relative amounts of variation in the data set 116 that are explained by or otherwise correlated with the features. For example, even though an initial matrix may simply depict that three events have historically occurred at the same time (e.g., a click, a user being in a certain age group, a certain web browser being used), decomposing the initial matrix can generate one or more component matrices with values that indicate which of the events are more likely to have a causal relationship.

Figure 2:
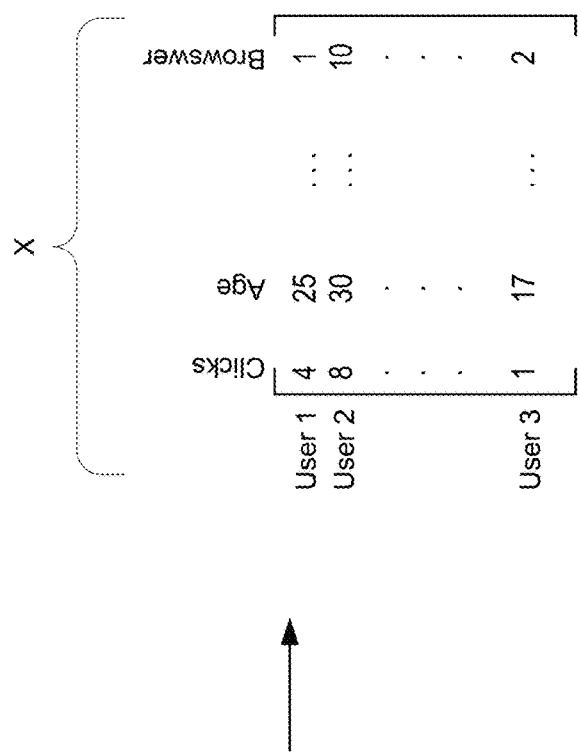
FIG. 2 is a diagram depicting examples of a data set that includes electronic marketing information and a corresponding data matrix that represents the data set according to certain exemplary embodiments.
Figure 2:
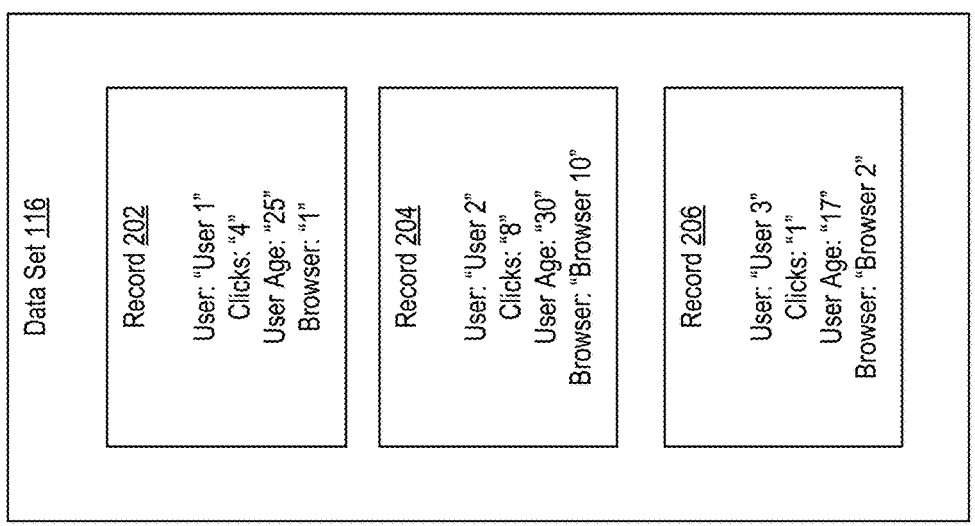

A relationship between the data set 116 and an associated matrix representation is depicted in FIG. 2, which depicts examples records 202, 204, 206 in the data set 116 and a corresponding data matrix X that represents the data set 116. In the depicted examples, the data matrix X has m rows and n columns. Each row of the data matrix X corresponds to a different user who has clicked a link in an electronic marketing communication 106. Each column of the data matrix X corresponds to a different feature associated with that user, including the number of clicks on a given electronic marketing communication 106, an age of the user that clicked on the electronic marketing communication 106, a type of web browser (designated with browser types 1 through 10) used to access the electronic marketing communication 106, etc.

The analytical application 114 identifies, calculates, or otherwise obtains the entries of the data matrix X by combining click data in records 202, 204, 206 of the data set 116. In the simplified example depicted in FIG. 2, the record 202 indicates that a 25-year-old user clicked four times on an electronic marketing communication 106 using a first type of browser (e.g., "type 1"). The record 204 indicates that a 30-year-old user clicked eight times on the electronic marketing communication 106 using a second type of browser (e.g., "type 10"). The record 206 indicates that a 17-year-old user clicked one time on the electronic marketing communication 106 using a third type of browser (e.g., "type 2").

The data matrix X represents the data from these records in a numerical form. The $x_{11}$ entry corresponds to the number of clicks by the first user, the $x_{12}$ entry corresponds to the age of the first user, and the $x_{1n}$ entry corresponds to the browser type for the first user. The corresponding rows for the second and third users likewise include the respective click numbers, ages, and browser types for those users.

The analytical application 114 uses at least some of the data from the data set 116 for training the analytical model 118. A data set may include a much larger number of features (e.g., hundreds or thousands) than the relatively data 116 depicted in FIG. 2. Such a large data set may have features such as high dimensionality, high sparsity (i.e., absence of data for certain features, such as the null "browser type" in FIG. 2), non-Gaussian distribution, high correlation, and an unstructured format. These features of a large data set 116 present disadvantages when attempting to identify relationships between features and user actions. These disadvantages include high computational costs and reductions in accuracy to the trained model.

The analytical application 114 can address these problems by extracting relevant features of the data set 116 prior to training the analytical model 118. In some embodiments, the analytical application 114 selects a threshold number k of the features from the original marketing data set 116 that account for a threshold amount (e.g., 80% to 90%) of the variation in user interaction data in the data set 116. The subset of k features that are selected from the set of m features covered by the data set 116 can reduce the complexity of the data used when training the analytical model 118.

Figure 3:
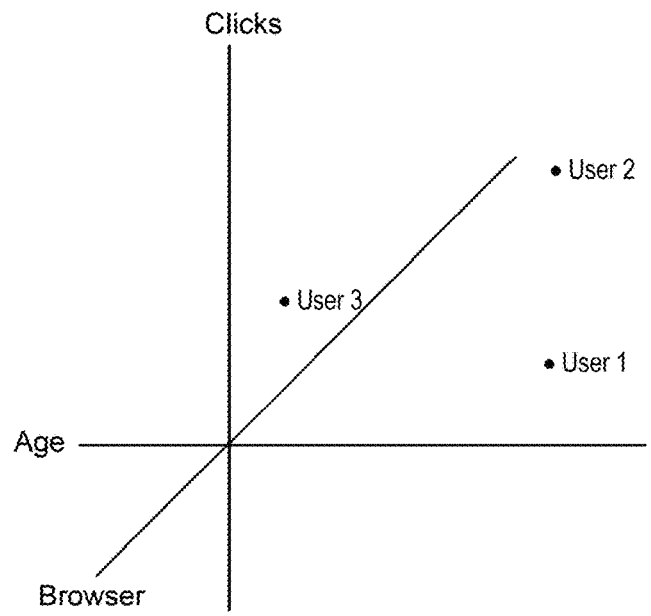
FIG. 3 is a diagram depicting an m×n dimensional space defined by the data matrix of electronic marketing information with m users and n user features that is depicted in FIG. 2 according to certain exemplary embodiments.
Figure 4:
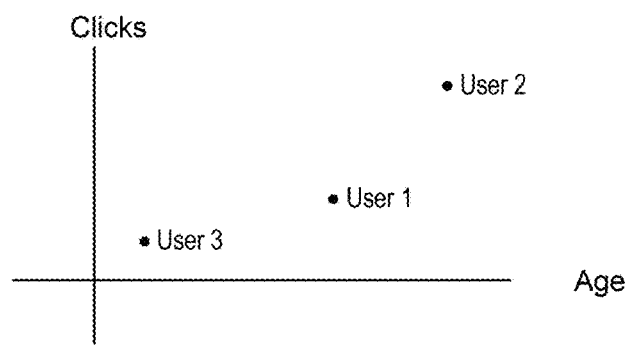
FIG. 4 is a diagram depicting an two-dimensional space defined by dimensions of the data matrix depicted in FIG. 2 that correspond to relevant features according to certain exemplary embodiments.

FIGS. 3 and 4 illustrate how reducing the number of features under consideration can simplify the process for training the analytical model 118. FIG. 3 is a diagram depicting a simplified example of an m-dimensional space defined by the features in the data matrix X. The three-dimensional space of FIG. 3 includes a first dimension corresponding to a user's age (e.g., the x-axis), a second dimension corresponding to a number of clicks (e.g., the y-axis), and a third dimension corresponding to a user's web browser type (e.g., the z-axis). The points in the three-dimensional space represent numbers of clicks that are associated with certain values for the user's age, region, and browser type.

It may be desirable for the analytical model 118 to use one or two of these three dimensions that represent the original data with high accuracy. For example, if data about one or two of the three dimensions (e.g., features) could be used to generate a matrix with data that has a threshold degree of similarity to the data of the original matrix, the selected one or two user features represent the original data with sufficiently high accuracy.

FIG. 4 is a diagram depicting a two-dimensional space defined by relevant features of the data matrix X that have been identified by the analytical application 114. The two-dimensional space of FIG. 4 includes a first dimension corresponding to a user's age (e.g., the x-axis) and a second dimension corresponding to a number of clicks (e.g., the y-axis). These dimensions can be defined based on a determination by the analytical application 114 that variations in user ages have a stronger correlation with variation in click numbers as compared to variations in the type of web browser used.

The reduced dimensionality of the data depicted in FIG. 4 can reduce the complexity of determining a relationship between features of the data set 116 using the analytical model 118. For example, if the analytical model 118 is focused on finding a function describing a relationship between the user age and click rate, the number of computing resources may be reduced and, in some cases, the accuracy of the determined relationship may be increased.

The data sets and dimensions depicted in FIGS. 3 and 4 are provided for purposes of discussion only. In some embodiments, the data set 116 and the corresponding matrix X may include hundreds of dimensions corresponding to different rows of the matrix X.

Figure 5:
FIG. 5 is a diagram depicting relationships between the data matrix of electronic marketing information that is depicted in FIG. 2 and additional matrices derived from the data matrix using a singular value decomposition according to certain exemplary embodiments.

In some embodiments, the analytical application 114 reduces the number of features that are used to train the analytical model 118 by performing a singular value decomposition of the data matrix X. FIG. 5 depicts an example of a singular value decomposition of a data matrix X that represents the marketing data set 116. The singular value decomposition for the data matrix X is:

$$X = UDV^t.$$

The matrix U includes left singular vectors. The matrix U is an m×n orthogonal matrix in which the product of U and its transpose are an identity matrix I, as shown below.

$$UU^t = U^tU = I.$$

The matrix V includes right singular vectors. The matrix V is an n×n orthogonal matrix in which the product of V and its transpose are an identity matrix I, as shown below.

$$VV^t = V^tV = I.$$

The matrix D is a diagonal matrix in which the non-negative diagonal values include the set of values $d_1, d_2, \ldots, d_n$, where $$d_1 \geq d_2 \geq \ldots \geq d_n \geq 0.$$

The matrices U, V, and D that are derived from the singular value decomposition represent a set of functions that are used to accurately approximate the original matrix X. For example, each row of the matrix U corresponds to a respective record from the marketing data set 116 and includes values that can be transformed into the entries of the matrix X. Each row of the matrix V includes a set of coefficients corresponding to different features in the data set 166. The coefficients are used to transform values in a row of the matrix U into corresponding values in the matrix X. For example, a matrix element $x_{ij}$ in the matrix X can be obtained from a weighting combination of the values in a row of the matrix U, where the values are weighted using the coefficients from a row of the matrix V that are scaled by a value in the matrix D.

In the example depicted in FIG. 5, the entries in the matrix U represent linear combinations of features from the matrix X. The entries in the columns of the matrix V include coefficients used in the linear combinations. The entries in the matrix U have different levels of significance. The significance of each new feature (i.e. coordinate specified by the matrix U) is, for example, an amount of variation or information in the original data that explained by a given new feature (i.e., a given column in the matrix U). For example, the significance of the coordinates in the matrix U decrease from the left to the right of the columns of U (e.g., the first column of matrix U is the most significant new feature, the second column of U is the second most significant new feature, etc.). However, since each new feature in matrix U is a linear combination of features from the original matrix X, an unconstrained singular value decomposition may not allow for easily identifying the significant original features from matrix X by looking at the significance of the new features in the matrix U.

For example, multiple decompositions can exist for a given matrix X. However, not all decompositions are useful for identifying relevant features of the marketing data set 116. In particular, an unconstrained singular value decomposition may not be useful for obtaining derived matrices that identify the relevant features in a data set 116. For example, a certain matrix element $x_{ij}$ in the matrix X is a weighted combination of the elements in a certain row vector of the matrix U, where the weights correspond to the elements in a certain column vector from the transpose of the matrix V. Since the column vectors from the transpose of the matrix V are the row vectors of the matrix V, and each row vector in matrix V corresponds to a feature in the data set 116, each element in a given column vector from the transpose of matrix V corresponds to a respective feature of the data set 116. Therefore, if the singular value decomposition is unconstrained, the elements of the column vector may have a large number of non-zero values. Because these elements have non-zero values, the relative contribution to a matrix element $x_{ij}$ (i.e., a value in the original data set 116) of a respective element (i.e., a feature in the original data set 116) may not be easily determined.

However, constraining the singular value decomposition such that the matrix V includes a limited number of row vectors with nonzero coefficient allows relevant features from the matrix X to be identified from the derived matrix V. Such a matrix V may be obtained by imposing constraints on the singular value decomposition that limit the permissible set of vectors $v_1 \ldots v_n$ (i.e., the derived matrix V) and the permissible set of vectors $u_1 \ldots u_m$ (i.e., the derived matrix U). By imposing constraints on these sets of vectors, the derived matrices from a singular value decomposition of the matrix X can reveal which of the original features from the data set 116 (e.g., "age") are more significant in the sense of being more informative (representing most of variation of the original data).

Figure 6:
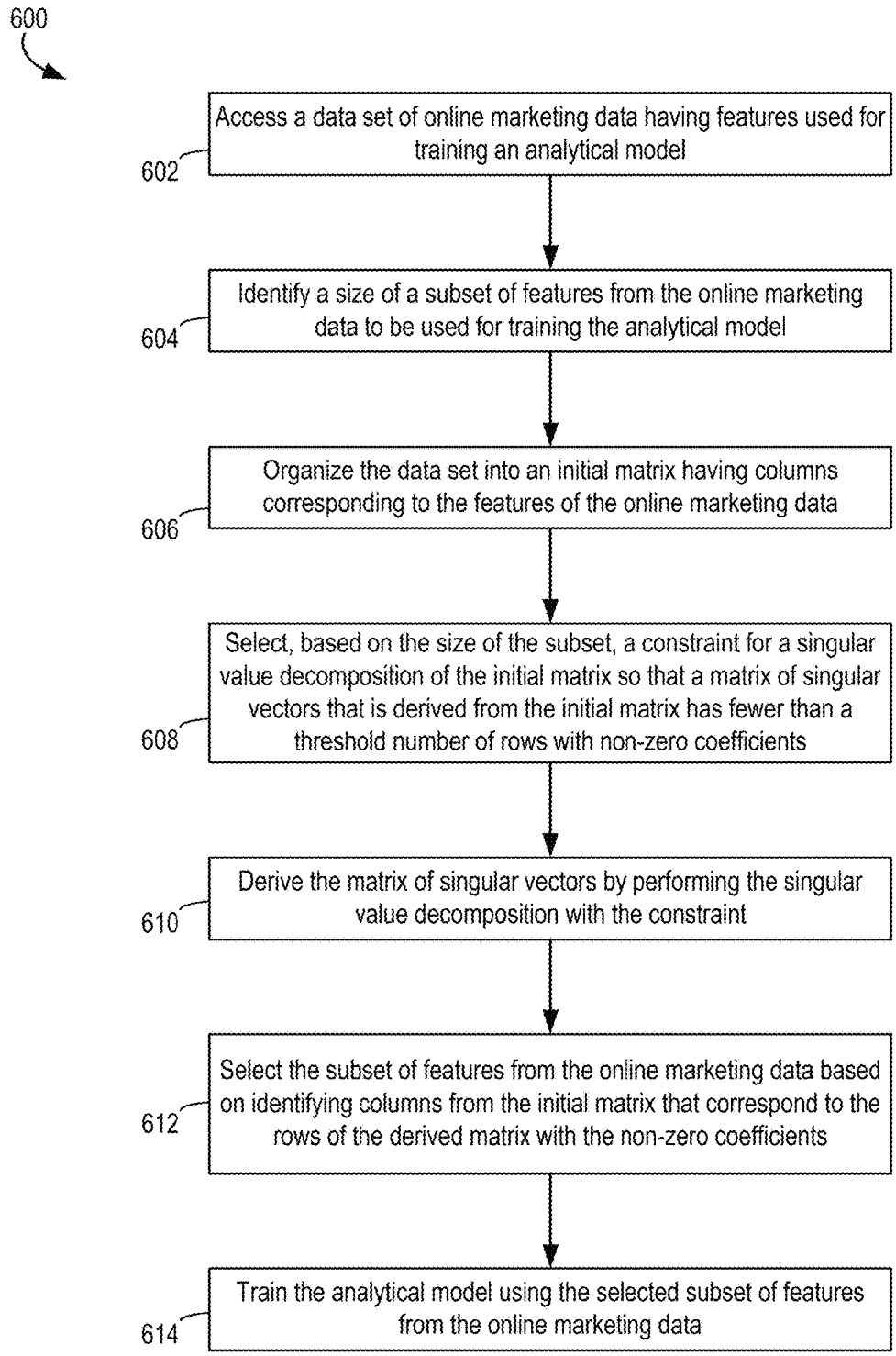
FIG. 6 is a flow chart depicting an example of a process for extracting relevant features of electronic marketing data for use in training an analytical model according to certain exemplary embodiments.

FIG. 6 is a flow chart depicting an example of a process for extracting more significant or otherwise relevant features of electronic marketing data for use in training an analytical model according to certain exemplary embodiments. For illustrative purposes, the process 600 is described with reference to the implementation depicted in FIGS. 1-5. Other implementations, however, are possible.

The process 600 involves accessing a data set of electronic marketing data having features used for training an analytical model, as depicted in block 602. In some embodiments, the analytical application 114 is executed by a suitable processing device to access the data set 116, which includes some or all of the electronic marketing data 120. The data set 116 may be accessed from a database or other suitable data structure that is stored on a non-transitory computer-readable medium accessible to the analytical application 114.

The process 600 also involves identifying a size of a subset of features from the electronic marketing data, where the subset of features is to be used for training the analytical model, as depicted in block 604. In some embodiments, the analytical application 114 is executed by a suitable processing device to access electronic data indicating a desired number of features used for training the analytical model.

In some embodiments, the electronic data indicating the desired number of features is provided to the analytical application 114 via input entered into one or more suitable interfaces. In one example, an analyst or other user of the analytical application 114 may specify that a certain number of features is to be used. In another example, an analyst or other user of the analytical application 114 may specify that any features having a threshold amount of significance (either singly or combination) should be used to train the analytical model 118. For instance, the user may specify that a given subset of features (e.g., user's age, profession, and income level) that represents 80% of variation throughout the data set should be used for training the analytical model 118.

In additional or alternative embodiments, the analytical application 114 automatically determines a desired number of features based on an availability of computing resources (e.g., processing power, memory, storage space, etc.) for training the analytical model 118. For example, the analytical application 114 may execute one or more operations to determine the memory, processing power, storage space, or some other computing resource available at the computing system 112. The analytical application 114 determines that the available computing resources are sufficient for training the analytical model 118 using a data set with k features. If the data 116 has n features, where n>k, the analytical application 118 determines that k features representing the largest amount of variation in the data set 116 should be used for training the analytical model 118.

In some embodiments, in models and algorithms used for data analysis and machine learning, the computational cost of a model implementation is directly dependent on the number of dimensions n for a data matrix X having m rows and n columns, where the columns represent features of the data set represented by the data matrix X. The computation cost for a model using such a data matrix X may be $O(n^3)$, which indicates that the computational cost is a function of $n^3$ (e.g., a multiple of $n^3$). The function $O(n^3)$ in this example represents the number of basic operations needed for computing a model or other algorithm for data analysis using the data set represented by the m×n data matrix X. As an example, if the number of the features in a data matrix is 30,000, a computational method that involves analyzing the data set represented by the matrix take $30,000^3 = 2.7e+10$ operations. The electronic marketing data 120 may involve even higher number of features (e.g., on the order of hundreds of thousands and millions), which further compounds the computational complexity involved in analyzing this data.

Large numbers of computing operations may translate to many hours or days of computing resources time for a single algorithm, and data analyses typically involve computing many algorithms. Using the original number of features for analyzing the data would occupy a computing system for a long period of time, which may decrease the usefulness of the analysis if real-time responses are required. The embodiments described herein allow for recognizing a small number of k significant features that represent the properties and the structure of the data set 116 with a sufficient degree of accuracy. In certain embodiments, a data set 116 may have five to ten significant features. For embodiments involving five significant features, the computational cost becomes a multiple of $5^3=125$, which is only a fraction of the original computational cost or $5^3/30000^3=4.62963e-12$, a negligible computation cost. Thus, the reduction of the features to only a handful of the original features may make the real-time analysis feasible by reducing the number of computational resources and reducing the amount of computing time.

The process 600 also involves organizing the data set into an initial matrix having columns corresponding to the features of the electronic marketing data, as depicted in block 606. In some embodiments, the analytical application 114 is executed by a suitable processing device to associate records in the data set 116 with rows of a matrix X and associate fields of the records with columns of the matrix X. In one example, records 202, 204, 206, which may be received from different computing system 108 or otherwise generated based on activity by different users or computing devices, are associated with the rows of the matrix X, as described above with respect to FIG. 2. Data in the fields of records 202, 204, 206 (e.g., "clicks," "age," "browser") are associated with the columns of the matrix X, as described above with respect to FIG. 2.

The process 600 also involves selecting, based on the identified size of the feature subset, a constraint for a singular value decomposition of the initial matrix so that a matrix of singular vectors that is derived from the initial matrix has fewer than a threshold number of rows with non-zero coefficients, as depicted in block 608. In some embodiments, the analytical application 114 is executed by a suitable processing device to identify one or more constraints for a singular value decomposition. The constraints for the singular value decomposition are selected such that fewer than all of the row vectors in the matrix V have non-zero elements.

In some embodiments, the analytical application 114 performs a rank-constrained singular value decomposition using an optimal Rank-1 approximation of the data matrix X. In this Rank-1 approximation, the derived matrices U and V respectively have row vectors $u_1 \ldots u_m$ and row vectors $v_1 \ldots v_n$ in which each row vector has an $l^2$ norm of 1. For example, the analytical application 114 computes the function $$\operatorname{argmin}_{(u,v,d)} \|X - duv^t\|_2^2 \qquad \text{(Equation 1)}$$

such that, in Equation 1,
$\|v\|_2^2 = \|u\|_2^2 = 1$ and subject to
$\min\|v\|_0$ and $\min\|u\|_0$ In this function, v represents one of the vectors $v_1 \ldots v_n$, d represents one of the values $d_1, d_2, \ldots, d_n$ from the matrix D, and u represents one of the vectors $u_1 \ldots u_m$. This function identifies vectors v of the matrix V and vectors u of matrix U that have an $l^2$ norm of 1 and that minimize the $l^2$ norm of the matrix Rank-1 approximation obtained by subtracting a matrix obtained by multiplying $duv^t$ from the matrix X. The function $\|v\|_0$ is the zero norm of vector v and the function $\|u\|_0$ is the zero norm of vector u. A zero-norm indicates the number of non-zero entries of any vector and, in this case, indicates the number of non-zero entries of the vectors v and u.

The operation above includes the zero-norm constraints such that the $l^0$ norm of the vectors v and u are minimized (i.e., by imposing the constraint $\min\|v\|_0$ and $\min\|u\|_0$). In some embodiments, computational speed and efficient use of computational resources may be increased by using a surrogate for the zero-norm (e.g., a norm that sufficiently approximates the useful aspects of zero-norm). For example, the computation of zero-norm may be prohibitively costly in terms of computing resources. A surrogate formulation of a trace norm may be used instead of the zero-norm. For example, the singular value decomposition can be constrained such that, for each vector v of matrix V and each vector u of matrix U, using trace norm surrogate, it becomes;

$\|v\|_t \le a_1$ and $\|u\|_t \le a_2$.

The variable $a_1$ represents a threshold value for the $l^0$ norm of the vectors v and the variable $a_2$ represents a threshold value for the $1^\circ$ norm of the vectors u. In this example, $a_1$ and $a_2$ are tuning parameters that can be used to determine the number of significant variables to be computed. The values for each of $a_1$ and $a_2$ are between 1 and $\sqrt{n}$, where n is the number of the original features (e.g., columns) of the data matrix X.

The thresholds $a_1$ and $a_2$ can control the number of non-zero coefficients in the row vectors of the matrix V. For instance, in the example of matrix V depicted in FIG. 5, using sufficiently small values of $a_1$ and $a_2$ can cause the analytical application 114 to perform a singular value decomposition in which the vector $v_1$ (which corresponds to the "clicks" feature) and the vector $v_2$ (which corresponds to the "age" feature) have a larger number of non-zero elements than vector $v_n$, which corresponds to the "browser" feature. These differences in the number of non-zero elements indicate that changes in the number of clicks are correlated much more strongly with a user's age than the user's browser type. As an example, if it is desirable to fin the most significant feature of the data set 116, the number of nonzero entries in v can be set to 1, in which $a_2 = 1$. In this example, all entries of v are zero, except for one non-zero entry. The feature corresponding to the non-zero entry is the most significant feature of the data matrix X.

The process 600 also involves deriving the matrix of singular vectors by performing the singular value decomposition with the constraint, as depicted in block 610. In some embodiments, the analytical application 114 is executed by a suitable processing device to derive the matrices U, D, and V by performing a singular value decomposition subject to the constraints identified at block 608. The analytical application 114 executes one or more well-known operations for performing the singular value decomposition.

In one example, the analytical application 114 executes a Golub-Kahan algorithm for the computation of the singular value decomposition. The analytical application 114 iteratively solves the optimization problem in Equation 1, which finds an optimal Rank-1 approximation to matrix X, by fixing all unknowns except one (e.g., u) to find an optimal u. The analytical application 114 iteratively solves the optimization problem in Equation 1. To do so, the analytical application 114 finds an optimal Rank-1 approximation to matrix X by fixing all unknowns except u to find an optimal u. The analytical application 114 then finds an optimal Rank-1 approximation to matrix X by fixing all unknowns except v to find an optimal v. This iteration continues until both u and v converge.

The process 600 also involves selecting the subset of features from the electronic marketing data based on identifying columns from the initial matrix that correspond to the rows of the derived matrix with the non-zero coefficients, as depicted in block 612. In some embodiments, the analytical application 114 is executed by a suitable processing device to select features from the data set 116 based on the constrained singular value decomposition performed at block 610. For example, the analytical application 114 identifies the row vectors of the matrix V having non-zero coefficients and selects one or more features from the data 116 that correspond to the row vectors with the non-zero coefficients.

In some embodiments, the analytical application 114 uses the presence or absence of non-zero coefficients in the row vectors of the matrix V to select features of the data set 116 for training the analytical model 118. In the example depicted in FIG. 5, the row vector corresponding to "age" may have non-zero coefficients. The presence of the non-zero coefficients in the age-related row vector (and simultaneously the presence of zero entries in other rows of V) indicates that the "age" feature is a highly significant feature, and is probably highly correlated with an output metric (e.g., "clicks") in the data set 116. The analytical application 114 selects the age feature from the data set based on the "age" row vector having the non-zero coefficients. By contrast, the row vector corresponding to "browser" may not have any non-zero coefficients. The absence of non-zero coefficients from the browser-related row vector indicates that the variations in the "browser" feature are not highly correlated with variations in an output metric (e.g., "clicks") in the data set 116. The analytical application 114 excludes the browser feature from the data set 116 based on the browser-related row vector lacking the non-zero coefficients.

In some embodiments, the analytical application 114 may exclude certain row vectors with non-zero coefficients if one or more characteristics of the row vectors indicate that the corresponding features lack sufficient significance. The significance of a feature may be, for example, the degree to which changes in that feature are correlated with changes in other features of the data set 116. Even if a row vector in the matrix V has non-zero coefficients, one or more characteristics of the row vector determined from the non-zero coefficients may indicate an insufficient significance of the feature corresponding to the row vector.

In some embodiments, the magnitude of one or more norms of a row vector is used to determine the significance of the row vector. An example of such a magnitude is a Euclidean distance for a vector. For instance, in the example depicted in FIG. 5, the row vector corresponding to "age" in the matrix V may have a larger number of nonzero elements, larger values for the nonzero elements, or both as compared to the row vector corresponding to "browser" in the matrix V. The larger number of nonzero elements and/or the larger values for the corresponding nonzero elements result in a greater value when the Euclidean distance of each vector is calculated. This greater value for the Euclidean distance of a vector corresponding to a feature indicates that changes in that feature are more strongly correlated with changes in the value of an output metric.

Figure 7:
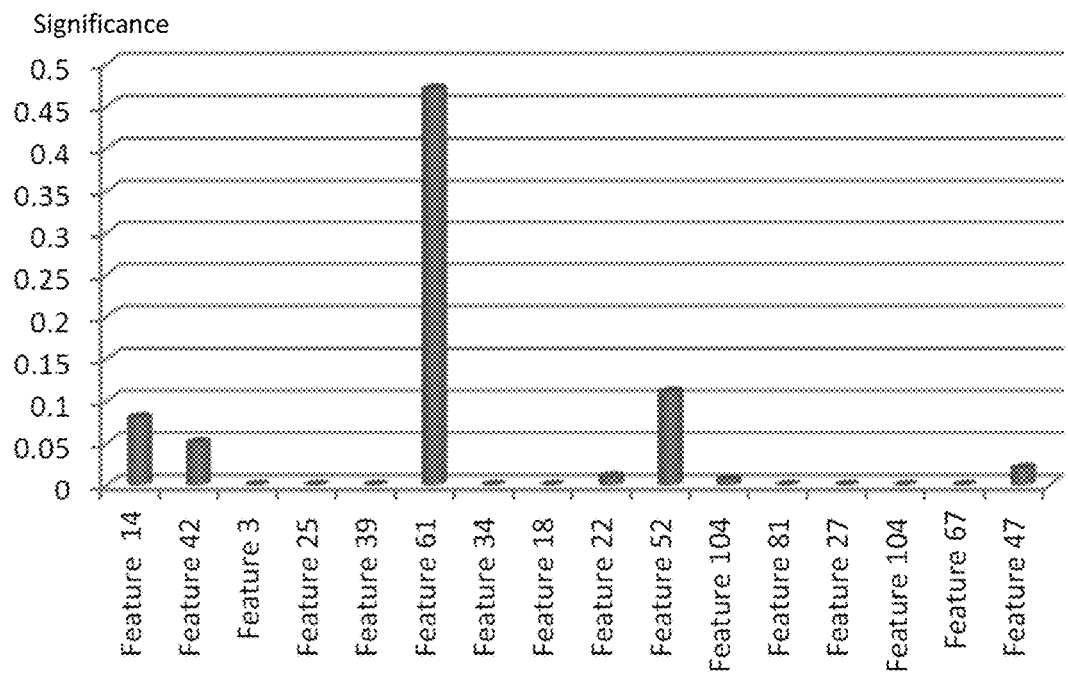
FIG. 7 is a chart depicting examples of features identified as relevant using the process depicted in FIG. 6 according to certain exemplary embodiments.
Figure 8:
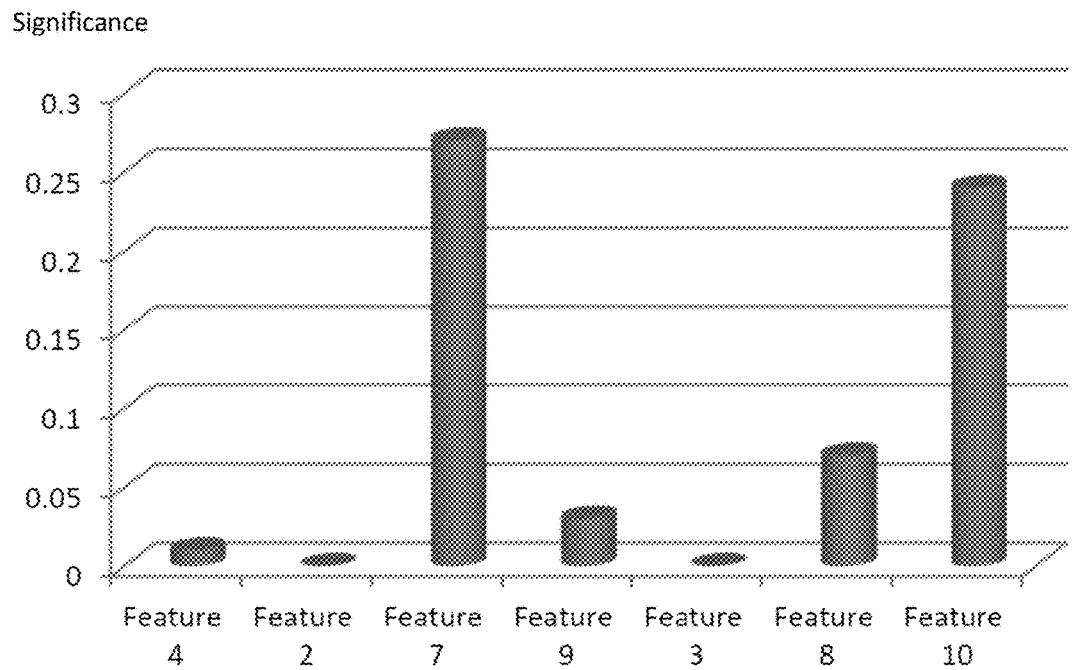
FIG. 8 is a chart depicting additional examples of features identified as relevant using the process depicted in FIG. 6 according to certain exemplary embodiments.

FIGS. 7 and 8 are charts depicting examples of the significance of one or more relevant features, which can be used to select features from the data set 116 at block 612. In the example depicted in FIG. 7, a 2,722×122 matrix was used to identify the lengths of time spent by users on different websites. A singular value decomposition of a 20,000×150 matrix was used to identify which of the 122 features are most significant (i.e., which of the websites accounted for more of the various time spent on websites). The relative significance of different features is depicted in the chart of FIG. 7, in which feature 61 had the largest influence (a normalized weight of 0.45), followed by the features 52 (normalized weight of 0.10), the features 14 (normalized weight of 0.07), 42 (normalized weight of 0.04), and 47 (normalized weight of 0.02).

In the example depicted in FIG. 8, a 75,715×12 matrix was used to identify conversion rates for different ad campaigns in different regions. A singular value decomposition of the 75,715×12 matrix was used to identify which of the 12 features are significant (i.e., which regions had the largest influence on the conversion rates). The relative significance of different features is depicted in the chart of FIG. 8, in which feature 7 had the largest significance, followed by the features 10, 8, 9, and 4.

Returning to FIG. 6, the process 600 also involves training the analytical model 118 using the selected subset of features from the electronic marketing data, as depicted in block 614. In some embodiments, the analytical application 114 is executed by a suitable processing device to perform one or more operations for training the analytical model 118. For instance, a subset of the data from the data set 116, which describes the selected subset of features identified at block 612, may be provided to the analytical model 118 as inputs. The analytical model 118 performs one or more well-known machine learning techniques to calculate, estimate, or otherwise determine relationships among the subsets of features. In a simplified example, a determined relationship between the "age" feature and the "clicks" feature may indicate that transmitting electronic communications 106 to users in a first age group is more likely to result in a given number of clicks than transmitting the electronic communications 106 to users in a second age group.

For purposes of illustration, various embodiments have been described that use electronic data generated by marketing communications. However, the embodiments described herein can be used to reduce the amount of training data for any machine-learning process.

Figure 9:
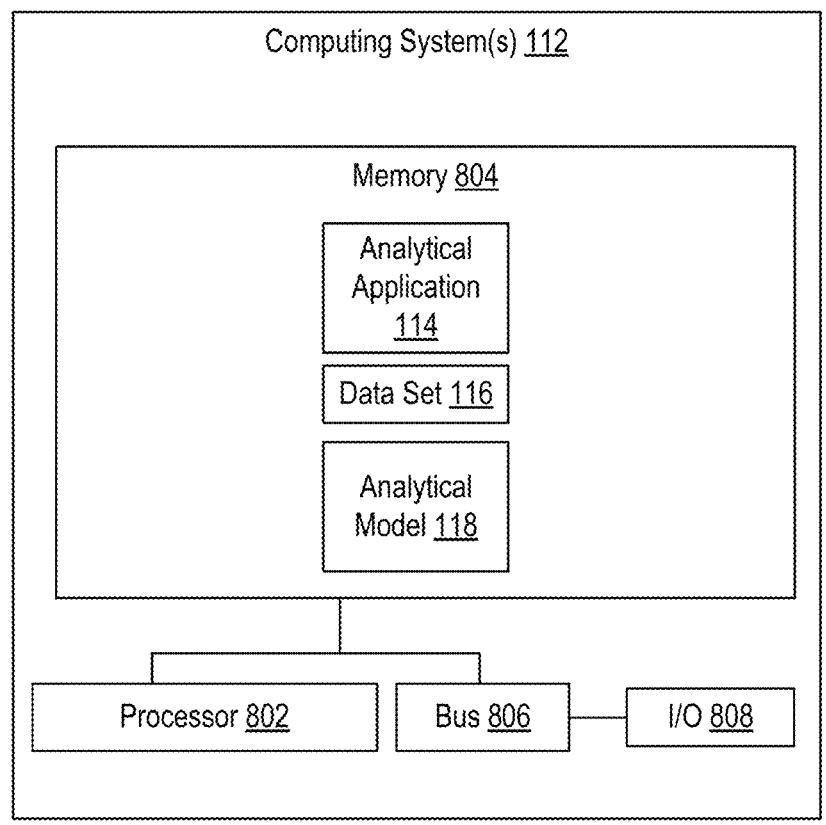
FIG. 9 is a block diagram depicting an example of a computing system that executes an asset management application for extracting relevant features of electronic marketing data to be used when training an analytical model according to certain exemplary embodiments.

Any suitable computing system or group of computing systems can be used for performing the operations described herein. For example, FIG. 9 is a block diagram depicting an example of a computing system 112 that executes the analytical application 114 extracting relevant features of electronic marketing data.

The computing system 112 includes one or more processors 802 communicatively coupled to one or more memory devices 804. The processor 802 executes computer-executable program code and/or accesses information stored in the memory device 804. Examples of processor 802 include a microprocessor, an application-specific integrated circuit ("ASIC"), a field-programmable gate array ("FPGA"), or other suitable processing device. The processor 802 can include any number of processing devices, including one.

The memory device 804 can include any suitable non-transitory computer-readable medium. The computer-readable medium can include any electronic, optical, magnetic, or other storage device capable of providing a processor with computer-readable instructions or other program code. Non-limiting examples of a computer-readable medium include a CD-ROM, a DVD, a magnetic disk, a memory chip, a ROM, a RAM, an ASIC, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing system 112 may also include a number of external or internal devices such as input or output devices. For example, the computing system 112 is shown with an input/output ("I/O") interface 808 that can receive input from input devices or provide output to output devices. A bus 806 can also be included in the computing system 112. The bus 806 can communicatively couple one or more components of the computing system 112.

The computing system 112 can execute program code that configures the processor 802 to perform one or more of the operations described above with respect to FIGS. 1-8. The program code can include, for example, the analytical application 114 or other suitable applications that may use a trained classifier algorithm 208 to match images for an automatic tagging process. The program code may be resident in the memory device 804 or any suitable computer-readable medium and may be executed by the processor 802 or any other suitable processor. In some embodiments, the data set 116 and program code for the analytical model 118 can be stored in the memory device 804, as depicted in FIG. 9. In other embodiments, one or more of the data set 116 and program code for the analytical model 118 can be stored in one or more memory devices accessible via a data network, such as a memory device accessible via a cloud service.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for efficiently using computing resources for training machine-learning models by identifying relevant features of data obtained from an online marketing campaign, the method comprising:

accessing, by a processor, a data set comprising features of electronic marketing data, wherein the features have values that are automatically generated by a plurality of user interactions with electronic marketing communications;

transforming, by the processor, the data set into a compressed dataset by extracting a subset of the features, wherein the compressed dataset includes less than all of the data from the data set, wherein extracting the subset of the features comprises:

identifying a size of the subset of the features, organizing the data set into an initial matrix, wherein columns of the initial matrix corresponds to respective features of the data set, selecting, based on the identified size of the subset, a constraint for a singular value decomposition of the initial matrix, wherein performing the singular value decomposition decomposes the initial matrix into a set of matrices that includes a matrix of singular vectors having (i) a first set of rows that each include only zero coefficients and (ii) a second set of rows that each include one or more non-zero coefficients, wherein performing the singular value decomposition with the constraint causes the matrix of singular vectors to have a number of rows in the second set of rows that is less than a threshold number of rows with non-zero coefficients, wherein a presence of a non-zero coefficient in a row indicates a significance of a corresponding feature represented in the initial matrix, deriving the matrix of singular vectors by performing the singular value decomposition with the constraint, selecting the subset of the features from the data set based on identifying a subset of columns from the initial matrix corresponding to the rows of the derived matrix with non-zero coefficients, and retrieving, from the data set, data corresponding to the selected subset of the features;

training, by the processor, a machine-learning model using the compressed dataset having the retrieved data corresponding to the selected subset of the features, wherein training or applying the machine-learning model on a particular dataset having n features involves a computational cost of at least $n^3$ computing operations, wherein said transforming facilitates real-time analysis using the machine-learning model by reducing a first n value of the data set to a second n value of the compressed dataset; and outputting the trained machine-learning model.

2. The method of claim 1, wherein organizing the data set into the initial matrix comprises:

identifying a first record and a second record in the data set;

associating the first record with a first row of the initial matrix and associating the second record with a second row of the initial matrix;

associating first values from fields in the first record with a first set of columns in the initial matrix; and associating second values from fields in the second record with a second set of columns in the initial matrix.

3. The method of claim 2, wherein the method further comprises transmitting the electronic marketing communications via a data network to a first computing device and a second computing device, wherein the first record is generated from a first data message received from the first computing device in response to the electronic marketing communications and the second record is generated from a second data message received from the second computing device in response to the electronic marketing communications.

4. The method of claim 3, wherein the fields of the first record and the fields of the second record comprise features of users of the first and second computing devices and features of sessions during which the plurality of user interactions occurred.

5. The method of claim 1, wherein performing the singular value decomposition comprises identifying a matrix of left singular vectors and a matrix of right singular vectors, wherein the matrix of right singular vectors includes the rows with the non-zero coefficients that are used to select the subset of the features.

6. The method of claim 1, wherein extracting the subset of the features from the data set further comprises:
  calculating a first magnitude for a norm of a first vector from the derived matrix using non-zero coefficients of the first vector;
  calculating a second magnitude for a norm of a second vector from the derived matrix using non-zero coefficients of the second vector; and
  selecting, for the subset, a first feature corresponding to the first vector rather than a second feature corresponding to the second vector based on the first magnitude being greater than the second magnitude, wherein the first magnitude indicates that the first feature corresponding to the first vector is associated with a larger amount of data variation in the initial matrix as compared to the second feature corresponding to the second vector.

7. The method of claim 1, further comprising, prior to accessing the data set, generating the data set by performing operations comprising:
  transmitting the electronic marketing communications via a data network, wherein interactions with the electronic marketing communications at computing devices causes the computing devices to automatically generate and transmit the electronic marketing data; and
  receiving the electronic marketing data from the computing devices via the data network.

8. The method of claim 1, wherein performing the singular value decomposition with the constraint comprises:
  selecting a threshold norm value that is less than or equal to a square root of a total number of the columns of the initial matrix;
  constraining the singular value decomposition such that:
    an $l^2$ norm of a matrix approximation is minimized, wherein the matrix approximation is computed by subtracting, from the initial matrix, a matrix obtained by multiplying (i) a vector d from a diagonal matrix outputted by the singular value decomposition, (ii) a vector u from a matrix of left singular vectors outputted by the singular value decomposition, and (iii) a transpose of a vector v that is from a matrix of right singular vectors outputted by the singular value decomposition, and
    one or more of (i) a norm of the vector u is less than or equal to the threshold norm value and (ii) a norm of the vector v is less than or equal to the threshold norm value.

9. The method of claim 8, further comprising selecting an additional threshold norm value that is less than or equal to the square root of the total number of the columns of the initial matrix,
  wherein the singular value decomposition is constrained such that the norm of the vector u is less than or equal to the threshold norm value, the norm of the vector v is less than or equal to the additional threshold norm value, an $l^2$ norm of the vector u is equal to 1, and an $l^2$ norm of the vector v is equal to 1.

10. The method of claim 9, wherein the norm of the vector u is a trace norm of the vector u and the norm of the vector v is a trace norm of the vector v.

11. The method of claim 1, wherein performing the singular value decomposition with the constraint comprises constraining the singular value decomposition such that:
  an $l^2$ norm of a matrix approximation is minimized, wherein the matrix approximation is computed by subtracting, from the initial matrix, a matrix obtained by multiplying (i) a vector d from a diagonal matrix outputted by the singular value decomposition, (ii) a vector u from a matrix of left singular vectors outputted by the singular value decomposition, and (iii) a transpose of a vector v that is from a matrix of right singular vectors outputted by the singular value decomposition,
  one or more of:
    (i) an $l^2$ norm of the vector u is equal to 1, and a different norm of t the vector u is less than or equal to a first threshold norm value, and
    (ii) a $l^2$ norm of the vector v is equal to 1, and a different norm of the vector v is less than or equal to a second threshold norm value.

12. A computing system for efficiently using computing resources for training machine-learning models by identifying relevant features of data obtained from an online marketing campaign, the computing system comprising:
  a processor; and
  a non-transitory computer-readable medium communicatively coupled to the processor,
  wherein the processor is configured for executing program code stored in the non-transitory computer-readable medium and thereby performing operations comprising:
    accessing a data set comprising features of electronic marketing data, wherein the features have values that are automatically generated by a plurality of user interactions with electronic marketing communications;
    transforming the data set into a compressed dataset by extracting a subset of the features, wherein the compressed dataset includes less than all of the data from the data set, the processor is configured to select the subset of the features by performing operations comprising:
      identifying a size of the subset of the features,
      organizing the data set into an initial matrix, wherein columns of the initial matrix corresponds to respective features of the data set,
      selecting, based on the identified size of the subset, a constraint for a singular value decomposition of the initial matrix, wherein performing the singular value decomposition decomposes the initial matrix into a set of matrices that includes a matrix of singular vectors having (i) a first set of rows that each include only zero coefficients and (ii) a second set of rows that each include one or more non-zero coefficients, wherein performing the singular value decomposition with the constraint causes the matrix of singular vectors to have a number of rows in the second set of rows that is less than a threshold number of rows with nonzero coefficients, wherein a presence of a non-zero coefficient in a row indicates a significance of a corresponding feature represented in the initial matrix, deriving the matrix of singular vectors by performing the singular value decomposition with the constraint, selecting the subset of the features from the data set based on identifying a subset of columns from the initial matrix corresponding to the rows of the derived matrix with non-zero coefficients, and retrieving, from the data set, data corresponding to the selected subset of the features;

training a machine-learning model using the compressed dataset having the retrieved data corresponding to the selected subset of the features, wherein training or applying the machine-learning model on a particular dataset having n features involves a computational cost of at least $n^3$ computing operations, wherein said transforming facilitates real-time analysis using the machine-learning model by reducing a first n value of the data set to a second n value of the compressed dataset.

13. The computing system of claim 12, wherein the processor is configured for organizing the data set into the initial matrix by performing operations comprising:

identifying a first record and a second record in the data set;

associating the first record with a first row of the initial matrix and associating the second record with a second row of the initial matrix;

associating first values from fields in the first record with a first set of columns in the initial matrix; and associating second values from fields in the second record with a second set of columns in the initial matrix.

14. The computing system of claim 12, wherein the processor is configured for performing the singular value decomposition by performing operations comprising identifying a matrix of left singular vectors and a matrix of right singular vectors, wherein the matrix of right singular vectors includes the rows with the non-zero coefficients that are used to select the subset of the features.

15. The computing system of claim 12, wherein the processor is configured for selecting the subset of the features from the data set by performing operations comprising:

calculating a first magnitude for a norm of a first vector from the derived matrix using non-zero coefficients of the first vector;

calculating a second magnitude for a norm of a second vector from the derived matrix using non-zero coefficients of the second vector; and selecting, for the subset, a first feature corresponding to the first vector rather than a second feature corresponding to the second vector based on the first magnitude being greater than the second magnitude, wherein the first magnitude indicates that the first feature corresponding to the first vector is associated with a larger amount of data variation in the initial matrix as compared to the second feature corresponding to the second vector.

16. The computing system of claim 12, wherein the processor is further configured for, prior to accessing the data set, generating the data set by performing operations comprising:

transmitting the electronic marketing communications via a data network, wherein interactions with the electronic marketing communications at computing devices causes the computing devices to automatically generate and transmit the electronic marketing data; and receiving the electronic marketing data from the computing devices via the data network.

17. A non-transitory computer-readable medium storing program code executable by a processor for efficiently using computing resources for training machine-learning models by identifying relevant features of data obtained from an online marketing campaign, the program code comprising:

program code for accessing a data set comprising features of electronic marketing data, wherein the features have values that are automatically generated by a plurality of user interactions with electronic marketing communications;

program code for transforming the data set into a compressed dataset by extracting a subset of the features, wherein the compressed dataset includes less than all data from the data set, wherein extracting the subset of the features comprises:

identifying a size of the subset of the features, organizing the data set into an initial matrix, wherein columns of the initial matrix corresponds to respective features of the data set, selecting, based on the identified size of the subset, a constraint for a singular value decomposition of the initial matrix, wherein performing the singular value decomposition decomposes the initial matrix into a set of matrices that includes a matrix of singular vectors having (i) a first set of rows that each include only zero coefficients and (ii) a second set of rows that each include one or more non-zero coefficients, wherein performing the singular value decomposition with the constraint causes the matrix of singular vectors to have a number of rows in the second set of rows that is less than a threshold number of rows with non-zero coefficients, wherein a presence of a non-zero coefficient in a row indicates a significance of a corresponding feature represented in the initial matrix, deriving the matrix of singular vectors by performing the singular value decomposition with the constraint, selecting the subset of the features from the data set based on identifying a subset of columns from the initial matrix corresponding to the rows of the derived matrix with non-zero coefficients, and retrieving, from the data set, data corresponding to the selected subset of the features;

program code for training a machine-learning model using data the compressed dataset having the retrieved data corresponding to the selected subset of the features, wherein training or applying the machine-learning model on a particular dataset having n features involves a computational cost of at least $n^3$ computing operations, wherein said transforming facilitates real-time analysis using the machine-learning model by reducing a first n value of the data set to a second n value of the compressed dataset.

18. The non-transitory computer-readable medium of claim 17, wherein the program code for organizing the data set into the initial matrix comprises:

program code for identifying a first record and a second record in the data set;

program code for associating the first record with a first row of the initial matrix and associating the second record with a second row of the initial matrix;

program code for associating first values from fields in the first record with a first set of columns in the initial matrix; and program code for associating second values from fields in the second record with a second set of columns in the initial matrix.

19. The non-transitory computer-readable medium of claim 18, wherein the fields of the first record and the fields of the second record comprise features of users of computing devices and features of sessions during which a plurality of user interactions occurred at the computing devices, wherein the program code for performing the singular value decomposition comprises program code for identifying a matrix of left singular vectors and a matrix of right singular vectors, wherein the matrix of right singular vectors includes the rows with the non-zero coefficients that are used to select the subset of the features.

20. The non-transitory computer-readable medium of claim 17, wherein the program code for selecting the subset of the features from the data set comprises:

program code for calculating a first magnitude for a norm of a first vector from the derived matrix using non-zero coefficients of the first vector;

program code for calculating a second magnitude for a norm of a second vector from the derived matrix using non-zero coefficients of the second vector; and program code for selecting, for the subset, a first feature corresponding to the first vector rather than a second feature corresponding to the second vector based on the first magnitude being greater than the second magnitude, wherein the first magnitude indicates that the first feature corresponding to the first vector is associated with a larger amount of data variation in the initial matrix as compared to the second feature corresponding to the second vector.

* * * * *